United States Patent
Nagaoka et al.

(10) Patent No.: US 9,673,465 B2
(45) Date of Patent: Jun. 6, 2017

(54) CATALYST, METHOD FOR PRODUCING CATALYST, AND METHOD FOR PRODUCING HYDROGEN-CONTAINING GAS USING CATALYST, AND HYDROGEN GENERATING DEVICE, FUEL CELL SYSTEM, AND SILICON-SUPPORTED CEZR-BASED OXIDE

(71) Applicants: OITA UNIVERSITY, Oita (JP); DOWA HOLDINGS CO., LTD., Tokyo (JP)

(72) Inventors: Katsutoshi Nagaoka, Oita (JP); Tatsuro Miyazaki, Okayama (JP); Takuya Yano, Okayama (JP); Kazumasa Ikari, Okayama (JP); Toshihiko Ueyama, Okayama (JP)

(73) Assignees: OITA UNIVERSITY, Oita (JP); DOWA HOLDINGS CO., LTD., Tokyo (JP)

( * ) Notice: Subject to any disclaimer, the term of this patent is extended or adjusted under 35 U.S.C. 154(b) by 88 days.

(21) Appl. No.: 14/378,506

(22) PCT Filed: Mar. 7, 2013

(86) PCT No.: PCT/JP2013/001457
§ 371 (c)(1),
(2) Date: Aug. 13, 2014

(87) PCT Pub. No.: WO2013/132862
PCT Pub. Date: Sep. 12, 2013

(65) Prior Publication Data
US 2015/0171448 A1 Jun. 18, 2015

(30) Foreign Application Priority Data

Mar. 9, 2012 (JP) ................... 2012-053670

(51) Int. Cl.
*B01J 23/63* (2006.01)
*B01J 23/76* (2006.01)
(Continued)

(52) U.S. Cl.
CPC ............. *H01M 8/0618* (2013.01); *B01J 8/08* (2013.01); *B01J 21/06* (2013.01); *B01J 23/002* (2013.01);
(Continued)

(58) Field of Classification Search
CPC .... B01J 37/0244; B01J 37/0072; B01J 23/10; B01J 23/755; B01J 37/16; B01J 35/026;
(Continued)

(56) References Cited

U.S. PATENT DOCUMENTS

2005/0176580 A1 8/2005 Osaka et al.
2008/0260628 A1 10/2008 Moon et al.
(Continued)

FOREIGN PATENT DOCUMENTS

JP 2007-136445 6/2007
JP 2008-229604 10/2008
(Continued)

OTHER PUBLICATIONS

Gao et al. "Production of syngas via autothermal reforming of methane in a fluidized-bed reactor over the combined CeO2—ZrO2/SiO2 supported Ni catalysts" 2008, International journal of hydrogen energy, 93, 5493-5500.*
(Continued)

*Primary Examiner* — Stanley Silverman
*Assistant Examiner* — Syed Iqbal
(74) *Attorney, Agent, or Firm* — Greenblum & Bernstein, P.L.C.

(57) ABSTRACT

The present invention provides a catalyst in which a reaction initiation temperature at which self-heating function is
(Continued)

exhibited is low and which is capable of suppressing carbon accumulation even when a reaction is repeated. The catalyst of the present invention includes a CeZr-based oxide, silicon, and a catalytically active metal, wherein the CeZr-based oxide satisfies $Ce_xZr_yO_2$ (x+y=1) and the silicon satisfies molar ratios of $0.02 \leq Si/Zr$ and $0.01 < Si/(Ce+Zr+Si) < 0.2$. When the catalyst is used, a reduction temperature for generating initial oxygen deficiency can be decreased. Depending on the catalytically active metal, a reduction activation treatment can be performed even at about 20° C. without any need for heating. In a repeated hydrogen generating reaction, the deposition of carbon generated on the surface of the catalyst can be suppressed, and a decrease in catalytic activity can be prevented.

9 Claims, 9 Drawing Sheets

(51) Int. Cl.

| | |
|---|---|
| H01M 8/12 | (2016.01) |
| C01B 3/40 | (2006.01) |
| H01M 8/06 | (2016.01) |
| H01M 8/0612 | (2016.01) |
| C01B 3/32 | (2006.01) |
| B01J 23/00 | (2006.01) |
| B01J 23/10 | (2006.01) |
| B01J 35/00 | (2006.01) |
| B01J 8/08 | (2006.01) |
| B01J 21/06 | (2006.01) |
| B01J 23/46 | (2006.01) |
| B01J 23/755 | (2006.01) |
| B01J 35/02 | (2006.01) |
| B01J 37/00 | (2006.01) |
| B01J 37/02 | (2006.01) |
| B01J 37/16 | (2006.01) |
| H01M 8/124 | (2016.01) |

(52) U.S. Cl.
CPC .............. *B01J 23/10* (2013.01); *B01J 23/464* (2013.01); *B01J 23/63* (2013.01); *B01J 23/755* (2013.01); *B01J 35/002* (2013.01); *B01J 35/026* (2013.01); *B01J 37/0072* (2013.01); *B01J 37/0244* (2013.01); *B01J 37/16* (2013.01); *C01B 3/326* (2013.01); *C01B 3/40* (2013.01); *B01J 2208/00814* (2013.01); *B01J 2523/00* (2013.01); *C01B 2203/025* (2013.01); *C01B 2203/0227* (2013.01); *C01B 2203/0261* (2013.01); *C01B 2203/066* (2013.01); *C01B 2203/1041* (2013.01); *C01B 2203/1058* (2013.01); *C01B 2203/1064* (2013.01); *C01B 2203/1082* (2013.01); *C01B 2203/1217* (2013.01); *C01B 2203/1235* (2013.01); *C01B 2203/142* (2013.01); *H01M 2008/1293* (2013.01); *Y02E 60/522* (2013.01); *Y02E 60/525* (2013.01); *Y02P 20/52* (2015.11)

(58) Field of Classification Search
CPC  B01J 2208/00814; B01J 23/464; B01J 21/06; B01J 23/002; B01J 23/63; B01J 2523/00; B01J 35/002; B01J 8/08; C01B 2203/1064; C01B 2203/1082; C01B 2203/1058; C01B 3/40; C01B 2203/1235; C01B 2203/0227; C01B 2203/025; C01B 2203/142; C01B 2203/066; C01B 2203/1041; C01B 3/326; C01B 2203/0261; C01B 2203/1217; H01M 8/0618; H01M 2008/1293; Y02E 60/50; Y02E 60/522; Y02E 60/525

See application file for complete search history.

(56) References Cited

U.S. PATENT DOCUMENTS

2009/0221421 A1  9/2009  Sagou et al.
2010/0303712 A1  12/2010  Nagaoka et al.

FOREIGN PATENT DOCUMENTS

| JP | 2009-178625 | | 8/2009 |
| JP | 2009178625 A | * | 8/2009 |
| JP | 2010-188238 | | 9/2010 |
| JP | 2011-183284 | | 9/2011 |

OTHER PUBLICATIONS

Gao et al., "Production of syngas via autothermal reforming of methane in a fluidized-bed reactor over the combined $CeO_2$—$ZrO_2$/$SiO_2$ supported Ni catalysts," *International Journal of Hydrogen Energy*, vol. 33, pp. 5493-5500, 2008.
International Search Report issued with respect to PCT/JP2013/001457 mailed Jun. 11, 2013; along with an English Translation thereof.
English translation of the International Preliminary Report on Patentability for PCT/JP2013/001457, which was issued on Sep. 9, 2014.
Partial European Search report issued with respect to application No. 13757174.1, mail date is Jun. 8, 2015.
Jing Gao et al., "Production of syngas via autothermal reforming of methane in a fluidized-bed reactor over the combined $GeO2$—$ZrO2/SiO2$ supported Ni catalysts", International Journal of Hydrogen Energy, 33, 2008, pp. 5493-5500.
Jing Qiangshan et al., "Fabrication of $CeZrO2$ on $Ni/SiO2$ and promoted catalysis for methane autothermal reforming in a fluidized bed reactor", Journal of Rare Earths, vol. 27, No. 3, Jun. 2009, pp. 431-436.

* cited by examiner

Fig. TPO MEASURING DEVICE

CATALYST, METHOD FOR PRODUCING CATALYST, AND METHOD FOR PRODUCING HYDROGEN-CONTAINING GAS USING CATALYST, AND HYDROGEN GENERATING DEVICE, FUEL CELL SYSTEM, AND SILICON-SUPPORTED CEZR-BASED OXIDE

FIELD

The present invention relates to a catalyst, a method for producing the catalyst, and a method for producing a hydrogen-containing gas using the catalyst, a hydrogen generating device, a fuel cell system, and a silicon-supported CeZr-based oxide.

BACKGROUND

The present applicant has proposed a catalyst that can exhibit a self-heating function even in a reduction activation treatment at relatively low temperature, and the like (Patent Literatures 1 and 2).

CITATION LIST

Patent Literature

Patent Literature 1: Japanese Patent Application Laid-Open No. 2008-229604
Patent Literature 2: Japanese Patent Application Laid-Open No. 2011-183284

SUMMARY

Technical Problem

However, such a catalyst has been known as follows. When a reaction using the catalyst is repeated, a small amount of carbon is deposited on a catalytically active metal during separation of hydrogen from hydrocarbon, and as a result, the catalytic activity reduces.

For example, in a cerium-zirconia-based oxide in which $ZrO_2$ is added to $CeO_2$, when the amount of $ZrO_2$ added is increased, the amount of heat generated after reduction increases. Therefore, the reaction initiation temperature lowers, and as a result, a reaction can be easily driven at normal temperature. However, a cracking reaction on a carrier proceeds, and as a result, the amount of carbon deposited increases. Thus, there is a problem in which the catalyst does not withstand the repeated reaction.

Therefore, it is an object of the present invention to provide a catalyst that is capable of suppressing carbon accumulation even when a reaction is repeated, and the like.

Solution to Problem

In view of the problem, the present inventors have found that a catalyst in which a predetermined amount of silicon is contained in an oxide represented by a general formula: $Ce_xZr_yO_2$ (x+y=1) and an active metal is supported on the oxide reduces the amount of carbon deposited. As a result, the problem has been solved.

Specifically, a catalyst of the present invention is a catalyst including a CeZr-based oxide, silicon, and a catalytically active metal, wherein the CeZr-based oxide satisfies $Ce_xZr_yO_2$ (x+y=1), and
the silicon satisfies molar ratios of $0.02 \leq Si/Zr$ and $0.01 < Si/(Ce+Zr+Si) < 0.2$.

In the catalyst of the present invention, the catalytically active metal is at least one selected from a platinum group element, nickel, and cobalt.

In the catalyst of the present invention, the silicon is localized on the surface of the CeZr-based oxide.

A method for producing a catalyst of the present invention includes the steps of:

(1) preparing a solution A containing at least one of an ammonium ion and a carbonate ion and a solution B containing cerium and zirconium;
(2) mixing the solution A and the solution B to prepare a mixed solution;
(3) bubbling a gas containing oxygen through the mixed solution;
(4) adding carbon dioxide or carbonate when carbonic acid is not contained in the mixed solution;
(5) adding a silicon-containing solution after the step (3) or the steps (3) and (4), to obtain a precipitate containing cerium, zirconium, and silicon;
(6) firing the precipitate in the air to coat a CeZr-based oxide containing cerium and zirconium with silicon;
(7) coating the CeZr-based oxide coated with silicon with a catalytically active metal; and
(8) adjusting the CeZr-based oxide coated with silicon and the catalytically active metal at 20 to 600° C. under a reduction atmosphere.

In the method for producing a catalyst of the present invention, the solution A is ammonia water.

In the method for producing a catalyst of the present invention, a silicon source contained in the silicon-containing solution is TEOS.

In the method for producing a catalyst of the present invention, the catalytically active metal is at least one selected from the group consisting of nickel, cobalt, and a platinum group element.

Further, a method for producing a hydrogen-containing gas of the present invention is a method for generating a hydrogen-containing gas by bringing a raw material gas containing hydrocarbon or alcohol and oxygen into contact with the afore-mentioned catalyst. The method includes:

a temperature increasing step of adjusting the catalyst at 20 to 600° C. under a reduction atmosphere to come into contact with oxygen in the raw material gas, and increasing the temperature of the raw material gas by self-heating of the catalyst to a temperature at which a burning reaction of hydrocarbon or alcohol with oxygen contained in the raw material gas occurs, to burn hydrocarbon or alcohol contained in the raw material gas; and a step of reforming the raw material gas using the catalyst of which the temperature is increased in the temperature increasing step.

In the method for producing a hydrogen-containing gas of the present invention, the catalyst is adjusted at 20 to 200° C. under a reduction atmosphere.

Moreover, a hydrogen generating device of the present invention is provided with a mechanism for supplying hydrocarbon or alcohol, and a mechanism for supplying oxygen, and is further provided with a reformer in which the afore-mentioned catalyst is disposed in a container connected to these mechanisms.

The hydrogen generating device of the present invention is also provided with a mechanism for separating hydrogen from a discharged gas, the mechanism being connected to the reformer.

A fuel cell system of the present invention includes the hydrogen generating device incorporated therein. Further, a silicon-supported CeZr-based oxide used in the catalyst of the present invention satisfies $Ce_xZr_yO_2$ (x+y=1) and molar ratios of $0.02 \leq Si/Zr$ and $0.01 < Si/(Ce+Zr+Si) < 0.2$.

Advantageous Effects of Invention

When the catalyst of the present invention is used as a hydrogen generating catalyst, a reduction temperature for causing initial oxygen deficiency can be decreased. Depending on a catalytically active metal, a reduction activation treatment can be performed even at about 20° C. without any need for heating. In a repeated hydrogen generating reaction, the deposition of carbon generated on the surface of the catalyst can be suppressed, and a decrease in catalytic activity can be prevented. Therefore, the catalytic performance can be maintained over a long period of time.

DESCRIPTION OF EMBODIMENTS

Figure 1:
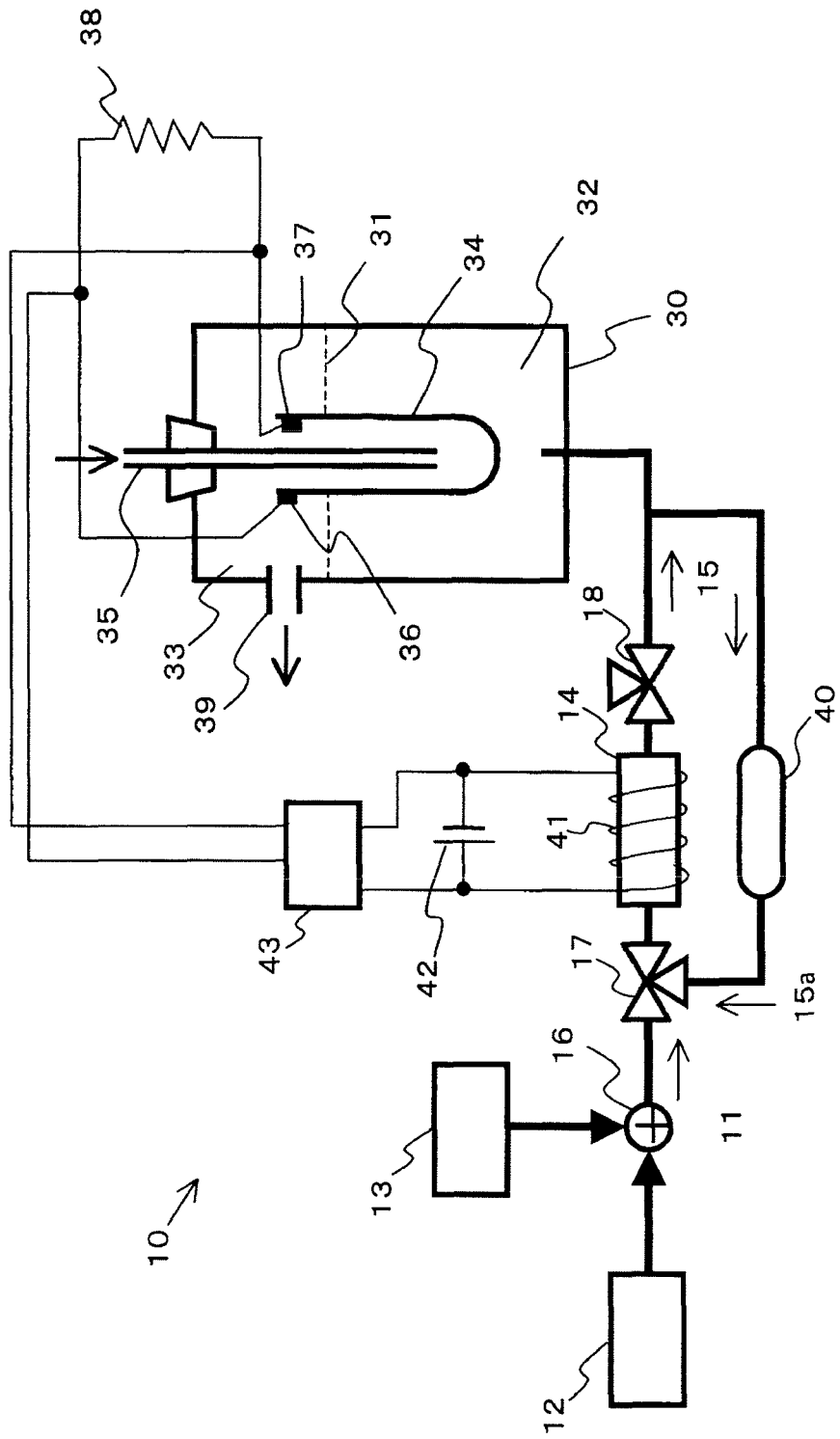
FIG. 1 is a view illustrating a configuration of a fuel cell system using a catalyst of the present invention.

Hereinafter, the present invention will be described in detail. The following description shows one example of an embodiment of the present invention, and the present invention is not restricted to the following embodiment. The description of the following embodiment can be modified without departing from the spirit of the present invention.

The catalyst of the present invention includes a CeZr-based oxide containing cerium and zirconium, silicon, and a catalytically active metal. Specifically, silicon is supported on a CeZr-based oxide that satisfies $Ce_xZr_yO_2$ (x+y=1) so that the silicon satisfies the molar ratios of $0.02 \leq Si/Zr$ and $0.01 < Si/(Ce+Zr+Si) < 0.2$ (hereinafter referred to as "precursor"), and a catalytically active metal is also supported.

The catalytically active metal used herein is a metal capable of promoting a reforming reaction of hydrocarbon at a predetermined temperature. Specific examples of the metal may include, among noble metals, ruthenium (Ru), rhodium (Rh), palladium (Pd), osmium (Os), iridium (Ir), and platinum (Pt), which are platinum group elements. Further, examples of the metal may include nickel (Ni), cobalt (Co), and copper (Cu), which are base metals. Ni and Co are preferable. Any combinations thereof may be used. In particular, when Rh is used, the carbon deposition amount can be significantly suppressed, and a lowest reduction temperature described below can also be decreased to near normal temperature.

In terms of the physical properties of the precursor, it is preferable that the specific surface area be large. This is because when the specific surface area of the precursor is large, an area that comes into contact with oxygen becomes large, and an effect of increasing the temperature of the catalyst can be further exhibited.

Hereinafter, the precursor in which silicon is supported on the oxide containing cerium and zirconium will be described as carrier particles of catalytically active metal.

<Production of Precursor>

In the precursor, cerium and zirconium are contained as a CeZr-based oxide that is $Ce_xZr_yO_2$, and the ratio of constituent elements satisfies x+y=1.0 when the molar ratio of Ce to Zr is x:y. It is preferable that Zr satisfy Zr/(Ce+Zr) of 0.50 or more, that is, a molar ratio y of Zr of 0.50 or more.

In the present invention, silicon (Si) is contained so that the molar ratio of silicon to zirconium that is measured, for example, with an inductively coupled plasma (ICP) spectrometry is 0.02 or more and satisfies the molar ratio of $0.01 < Si/(Ce+Zr+Si) < 0.2$. Therefore, the deposition of carbon on the catalytically active metal can be suppressed to solve a problem in which an increase in the amount of added $ZrO_2$ causes a reduction in a hydrogen production performance of the catalyst. Accordingly, Zr can be contained so that the molar ratio satisfies Zr/(Ce+Zr) of 0.50 or more.

Specifically, the amount of added Ce that is an essential element is kept to the minimum, and as a result, an action of decreasing the reforming reaction initiation temperature of the raw material gas during hydrogen generation that is exhibited by $ZrO_2$ and an action of suppressing the deposition of carbon on the catalytically active metal that is exhibited by $SiO_2$ can be effectively exhibited. Therefore, since Ce, Zr, and Si are contained in the catalyst within the ranges of the present invention, the synergistic effect of these three elements is exerted. Accordingly, very excellent effect is successfully produced on the decrease in the reaction initiation temperature and the reduction activation treatment temperature and the suppression of the carbon deposition amount on the catalytically active metal.

In the CeZr-based oxide, Zr with which Ce in a cerium oxide structure is not substituted may be present as an impurity phase. However, the presence of the impurity phase is permitted as long as the effects of the present invention are not impaired. If an allowable amount of the impurity phase is present, the molar ratio in a composite oxide as a whole including Ce and Zr in the impurity phase needs to satisfy the above conditions.

The CeZr-based oxide used in the present invention needs to be subjected to a reduction treatment to express a self-heating function. Through such a treatment, oxygen deficiency may be generated in a site of oxygen in $Ce_xZr_yO_2$. Since the CeZr-based oxide has such a deficient site of oxygen, oxygen can be incorporated from the surroundings. An amount of heat generated during the incorporation of oxygen is sufficient to increase the temperature of the catalyst itself at once from normal temperature to a temperature at which the catalytic performance of the catalytically active metal can be expressed. Accordingly, heating from the outside is not necessary.

The precursor can be suitably synthesized by a method in which a precipitated product obtained by a wet method is fired. For example, a water-soluble salt of Ce and a water-soluble salt of Zr are precipitated using a precipitant. After that, a water-soluble salt of Si is added to obtain a precipitate containing cerium, zirconium, and silicon. The obtained precipitate is then dried and fired to obtain the precursor.

Specifically, to an aqueous solution in which a water-soluble salt (for example, nitrate) of Ce and a water-soluble salt of Zr are dissolved, a substance containing at least one of an ammonium ion and a carbonate ion as a precipitant is added, causing a reaction. As a result, a precipitate is produced. To the obtained precipitate, a water-soluble salt of Si is added to produce a precipitated product. The precipitated product is filtrated, washed, dried, and fired to obtain the precursor. The upper limits of concentrations of ions of Ce and Zr in the solution in which the precipitates are formed are determined by their solubilities.

In order to obtain the precipitate, it is preferable that a precipitant containing at least one of an ammonium ion and a carbonate ion be used. Specifically, a precipitant containing an ammonium ion is preferably ammonia water, and a precipitant containing a carbonate ion is preferably carbonated water, carbon dioxide, sodium carbonate, potassium carbonate, or sodium hydrogen carbonate.

Ammonia water or a mixture of water-soluble salts of ammonium may be used, or an ammonium carbonate compound having functions of both the precipitants may be used. Specifically, ammonium carbonate, ammonium hydrogen carbonate, or the like, can be used. When the precipitant containing an ammonium ion is used, it is preferable that a mixture of oxides be produced by blowing a gas containing oxygen such as air into the precipitant, resulting in oxidation. When the precipitant containing an ammonium ion is used and carbonic acid is not contained in a mixed solution, it is preferable that carbon dioxide or carbonate be further added.

Further, the precipitate can also be obtained by containing urea in a raw material salt solution, heating the raw material salt solution to decompose the urea, and as a result, generating ammonia to make the salt solution alkaline. The pH of the solution during production of the precipitate is preferably controlled within a range of 6 to 11.

As a Ce compound, a Zr compound, and a Si compound, each hydrolyzable compound is prepared. These compounds may be added to water and hydrolyzed to form a sol mixture. Thus, the sol mixture may be subjected to aggregation and precipitation. Examples of the hydrolyzable compounds may include alkoxides and β-keto acid salts of the respective metal elements.

The precipitate is, if necessary, filtrated, washed with water, dried by vacuum or air drying, and subjected to a firing treatment to obtain a precursor. In this process, in order to enhance a dewatering effect, the precipitate may be dried in a powder state or a predetermined granulation state immediately after filtration. Further, the firing treatment may be a heat treatment, for example, at 400 to 1,000° C., and preferably 500 to 850° C.

<Supporting of Active Metal>

On the surface of the precursor, the catalytically active metal used as a catalytically active component of oxidative reformulation of hydrocarbon is supported. A raw material for the catalytically active metal is dissolved in a solvent, the precursor is added to the solvent, and the solvent is vaporized to support the catalytically active metal on the precursor. Herein, "coating" and "supporting" are used so as to represent the same meanings. Therefore, even when there is a part where an active metal does not present on the surface of the precursor, the precursor may be considered as "being a coated state."

<Reduction Activation Treatment>

The precursor on which the catalytically active metal is supported is subjected to a reduction activation treatment to form an oxygen deficiency site. Thus, the catalyst of the present invention is produced.

When the catalyst of the present invention is subjected to a reduction activation treatment once, an oxygen deficiency site is deleted by oxidation, to loss the self-heating performance. The resultant is also referred to as a "catalyst." This is because the self-heating performance is recovered by a further reduction activation treatment.

Specifically, the reduction activation treatment is performed as follows. A normal-pressure fixed-bed flow reactor having a metallic reaction tube that is subjected to a deactivation treatment in the inside thereof is charged with the precursor on which the catalytically active metal is supported, to form a catalyst layer. The temperature is adjusted to 20 to 600° C., and preferably 20 to 200° C. while pure hydrogen ($H_2$) is caused to pass therethrough. Herein, "adjusting" means exposure to the temperature for a predetermined time. This is also referred to as "temperature adjustment."

Such temperature adjustment is necessary to obtain the catalyst of the present invention. Of course, control to a lower temperature is advantageous in terms of cost, and the like. For example, when Rh is used as the catalytically active metal, the reduction activation treatment may be also performed at 20° C. In this case, the reduction activation treatment can be performed by temperature adjustment without any need for heating.

If a raw material gas contains oxygen, heat is generated by autoxidation caused by the oxygen even from a state in which the temperature of the catalyst of the present invention is normal temperature. The heat causes a reforming reaction of the raw material gas using the catalytically active metal in the catalyst, to generate a gas containing hydrogen. Since the temperature increasing rate is high in the exothermic reaction, the hydrogen-containing gas can be generated for a short time.

Then, a fuel cell system using the catalyst of the present invention will be described simply with reference to FIG. 1. In the description of the embodiment, a solid oxide fuel cell (solid oxide fuel cell, hereinafter referred to as "SOFC") system is used as an example. However, the present invention is not limited to the embodiment. A fuel cell system 10 of the present invention includes a hydrocarbon gas supplier 12, an oxygen supplier 13, a reformer 14, and an SOFC 30.

The hydrocarbon gas supplier 12 supplies a hydrocarbon gas to be introduced into the reformer 14. The hydrocarbon gas supplier 12 may include a devulcanization device. The oxygen supplier 13 mixes oxygen with the hydrocarbon gas supplied from the hydrocarbon gas supplier 12. Mixing is performed using a mixing valve 16. Oxygen supplied by the oxygen supplier 13 may be pure oxygen or oxygen which may contain nitrogen and the like, or may be air.

A hydrocarbon gas 11 containing oxygen is supplied to the reformer 14 through a valve 17. The reformer 14 is charged with the catalyst of the present invention. The hydrocarbon gas supplier 12, the oxygen supplier 13, the mixing valve 16, and the reformer 14 constitute a hydrogen generating device. From the reformer 14, a reformed gas 15 mainly containing hydrogen and carbon monoxide is discharged, and caused to pass through a valve 18 to the SOFC 30. The type of the SOFC 30 is not particularly limited, and any type may be used. Further, the system will be described with reference to a general Westinghouse cylindrical tubular vertically-striped cell.

The SOFC 30 is divided into an anode region 32 and a cathode region 33 by a sealless partition plate 31. A solid electrolyte 34 has a cylindrical shape with a closed end, and a closed end side thereof is disposed between the sealless partition plate 31 and the anode region 32 while an open end side thereof is disposed in the cathode region 33. In the open end, an end of an oxygen supplying pipe 35 that is inserted from a side of the cathode region 33 of the SOFC 30 is inserted into the solid electrolyte 34. Also oxygen supplied from the oxygen supplying pipe 35 may be not only pure oxygen but also air.

Thus, the outside of the tube of the solid electrolyte 34 comes into contact with a reformed gas in the anode region 32 to form a fuel electrode. The inside of the tube of the solid electrolyte 34 comes into contact with oxygen to form an air electrode. A negative electrode 36 is disposed on the outside of the tube of the solid electrolyte 34, and a positive electrode 37 is disposed on the inside of the tube. When a load 38 is connected to these electrodes through lead wires, a current can be output.

An outlet 39 of exhaust gas after burning is disposed in the cathode region 33 of the SOFC 30.

Next, an operation of the fuel cell system 10 will be described. The fuel cell system 10 is first in a stop state. The stop state herein represents a situation in which both the reformer 14 and the SOFC 30 are in a normal temperature state.

The fuel cell system 10 of the present invention is equipped with a heat source 41 to reactivate a catalyst, as described below. However, this source is not used during starting of the system. During starting of the system, a mixed gas of hydrocarbon gas from the hydrocarbon gas supplier 12 and oxygen from the oxygen supplier 13 is caused to pass into the reformer 14. The catalyst in the reformer 14 is oxidized by oxygen in the mixed gas to self-heat. By this heating, the temperature of the catalyst itself increases to a temperature at which the mixed gas is burned, and the mixed gas is burned. As a result, the temperature increases to a starting temperature at which a reforming reaction is caused, and high-temperature CO and $H_2$ are produced from hydrocarbon in the mixed gas. A gas containing CO and $H_2$ is a reformed gas 15. The reformed gas 15 is supplied to the SOFC 30, and the SOFC 30 starts power generation.

In the fuel cell system 10 of the present invention, a tank 40 for temporarily storing the reformed gas 15 containing hydrogen that is further generated by the reformer 14, the heat source 41 for heating the reformer 14, a power supply 42 for driving the heat source 41, and a charge controller 43 for charging the power supply are disposed. In the tank 40, only a predetermined amount of the reformed gas 15 generated by the reformer 14 is stored. The negative electrode 36 and the positive electrode 37 are connected to the charge controller 43 through lead wires to charge the power supply 42. The power source 42 is thereby charged during operation of the fuel cell system 10.

The fuel cell system 10 of the present invention can be repeatedly started and stopped. However, when the catalyst is oxidized during stopping, a catalytic performance and a self-heating performance are deactivated. In this case, the catalyst is regenerated as follows.

The valve 17 is switched to be opened from the tank 40 to the reformer 14. The valve 18 is switched to be opened to the air. Subsequently, a current is applied from the power source 42 to the heat source 41 while the reformed gas containing hydrogen is supplied from the tank 40, and as a result, the reformer 14 is heated. The heat source 41 may be a hot wire of nichrome or the like. The temperature of the reformer 14 can be adjusted to 20 to 600° C., and preferably 20 to 200° C.

While this state is maintained for a predetermined time, the valves 17 and 18 are closed, and energization to the heat source 41 is stopped. The catalyst of the present invention can be sufficiently regenerated at about 200° C. In some cases, the catalyst in the reformer 14 can be regenerated at about 20° C. without heating through the above-described procedure.

EXAMPLES

Hereinafter, the performance of the catalyst of the present invention will be described with reference to the results of Examples.

Examples 1 to 4

Solution B 125 g of cerium nitrate hexahydrate ($Ce(NO_3)_3.6H_2O$) as a Ce source and 77.3 g of zirconium acetate (purity: 34.0%) as a Zr source were dissolved in 750 f of nitric acid adjusted to 4%, and nitrogen was bubbled through the solution to remove dissolved oxygen. Thus, a solution B was prepared.

Silicon-Containing Solution 5.0 g of tetraethyl orthosilicate (TEOS: $Si(OC_2H_5)_4$) was added to 45.0 g of pure water and stirred to prepare a silicon-containing solution.

In a 5,000-mL reactor equipped with a temperature adjustment function, a stirrer, and a gas supplying nozzle on a lower portion, 3,000 g of a solution in which a 23.0% ammonia solution was diluted to a concentration of 2.0% was placed. The temperature of the solution was adjusted to 50° C. with stirring, to prepare a solution A. After the temperature was stable, the solution B was added thereto to prepare a mixed solution. The mixed solution was allowed to stand until the solution was stable at 50° C.

After that, air was added to the mixed solution from the lower portion of the reactor, to precipitate a crystal to become a nucleus. The supply of air was stopped, and the solution was aged for 10 minutes with stirring. 10 g of 23% ammonia water was added thereto and the mixture was aged for another 10 minutes. Subsequently, the mixture was stirred for 30 minutes while carbon dioxide was added at 375 mL/min.

The supply of carbon dioxide was stopped, and the mixture was then aged for 10 minutes. A silicon-containing solution was added thereto, and the mixture was then aged for 30 minutes, to obtain a precipitate containing cerium, zirconium, and silicon.

The obtained precipitate was separated by filtration from the reaction mother solution, washed with water, dried at 130° C. for 6 hours in the air, heat treated at 300° C. for 10 hours, and fired at 800° C. for 4 hours. As a result, a precursor containing cerium, zirconium, and silicon, according to the present invention, was obtained. The ratio Si/(Si+Ce+Zr) of the precursor was adjusted by changing the mixed ratio of the solution B and the silicon-containing solution.

Specifically, each preparation was performed so that Si/(Si+Ce+Zr) in Example 1 was 1%, Si/(Si+Ce+Zr) in Example 2 was 4%, Si/(Si+Ce+Zr) in Example 3 was 5%, Si/(Si+Ce+Zr) in Example 4 was 10%, Si/(Si+Ce+Zr) in Example 5 was 2.5%, and Si/(Si+Ce+Zr) in Example 6 was 10%. The precursors obtained according to the addition amounts were analyzed with an ICP spectrometry. The results are shown in Table 1 (Examples 1 to 4 and Comparative Examples 1 and 2) and Table 3 (Examples 5 and 6). These ratios are calculated as values represented in % by mole.

As a catalytically active metal, Ni was used in Examples 1 to 4 and Comparative Examples 1 and 2, and Rh was used in Examples 5 and 6, to coat the surface of the precursors. Specifically, the following procedures were performed.

When Ni was used as a catalytically active component in a 300-mL beaker, a Ni aqueous solution, in a total volume of 0.15 L, in which 0.50 g of $Ni(NO_3)_2 \cdot 6H_2O$ was dissolved in distilled water was obtained. In contrast, when Rh was used as a catalytically active component, an Rh aqueous solution, in a total volume of 0.15 L, in which 0.29 g of $Rh(NO_3)_3 \cdot nH_2O$ (Rh purity: 35.3%) (available from Mitsuwa Chemistry Co., Ltd.) was dissolved in distilled water was obtained.

After 10 g of the precursor prepared by the above-discussed method was placed in a beaker in which the Ni aqueous solution or the Rh aqueous solution was placed, the mixture was stirred at room temperature for 12 hours until the solution and the precursor were completely mixed.

Subsequently, the beaker was heated on a heat type hot stirrer, and the mixture was stirred. A moisture content was vaporized to coat the precursor with Ni or Rh. The precursor was dried at 60° C. for 24 hours in a drier to obtain a Ni- or Rh-supported precursor.

The Ni- or Rh-supported precursor was pulverized in a magnetic mortar, placed in a container made of pyrex (registered trademark) glass, and heat-treated at 450° C. for 5 hours in the air in a vertical tubular furnace. At this time, the temperature increasing rate was 10° C./min. After the heat treatment, the precursor was naturally cooled to room temperature.

The resultant powder of the Ni- or Rh-supported precursor was subjected to a reduction activation treatment as follows. A normal-pressure fixed-bed flow reactor having a quartz reaction tube was prepared, and the quartz reaction tube was charged with 0.1 g of the Ni- or Rh-supported precursor powder to form a catalyst layer. The used quartz reaction tube has an outer diameter of 9.9 mm and an inner diameter of 7.0 mm.

Pure hydrogen ($H_2$) was caused to pass through the quartz reaction tube at a passage rate of 30 mL/min, a pressure of 0.1 MPa, and a treatment temperature of 25 to 600° C., to perform a reduction activation treatment. The temperature increasing rate to a heat treatment temperature was 10° C./min and the retention time in the reduction heat treatment temperature was 1 hour.

Comparative Example 1

A catalyst of Comparative Example 1 was obtained by the same operation as in Example 1 except that a Si source was not added and components were adjusted at a ratio of Table 1 so that Zr/(Ce+Zr) was 0.50.

Comparative Example 2

A catalyst of Comparative Example 2 was obtained by the same operation as in Comparative Example 1 except that Zr/(Ce+Zr) was 0.12. The catalysts in Examples 1 to 4 and Comparative Examples 1 and 2 were each referred to as a Ni-supported catalyst and the catalysts in Examples 5 and 6 were each referred to as a Rh-supported catalyst.

<Composition and Structure>

The resultant catalyst powders were measured with an X-ray photoelectron spectroscopy (XPS) and an ICP spectrometry. The results are shown in Table 1. Only the data of the ICP spectrometry in Examples 5 and 6 are shown in Table 3. The results of measurement with the ICP spectrometry roughly correspond to the composition ratio during the addition. As seen from the results, Si is supported on a CeZr-based oxide at a target composition ratio.

TABLE 1

|  |  |  | Ce | Zr | Si | Ce/(Ce+Zr) | Zr/(Ce+Zr) | Si/(Ce+Zr+Si) | Si/Zr | Si RATIO SURFACE/WHOLE |
|---|---|---|---|---|---|---|---|---|---|---|
| EXAMPLE 1 | Si 1% | ICP | 0.50 | 0.50 | 0.01 | 0.50 | 0.50 | 0.01 | 0.02 | 10.89 |
|  |  | XPS | 0.39 | 0.50 | 0.11 | 0.44 | 0.56 | 0.11 | 0.22 |  |
| EXAMPLE 2 | Si 4% | ICP | 0.48 | 0.48 | 0.04 | 0.50 | 0.50 | 0.04 | 0.08 | 4.59 |
|  |  | XPS | 0.31 | 0.50 | 0.18 | 0.39 | 0.61 | 0.18 | 0.37 |  |
| EXAMPLE 3 | Si 5% | ICP | 0.47 | 0.48 | 0.50 | 0.50 | 0.50 | 0.05 | 0.10 | 3.83 |
|  |  | XPS | 0.40 | 0.43 | 0.18 | 0.48 | 0.52 | 0.18 | 0.41 |  |
| EXAMPLE 4 | Si 10% | ICP | 0.45 | 0.45 | 0.10 | 0.50 | 0.50 | 0.10 | 0.21 | 4.24 |
|  |  | XPS | 0.29 | 0.31 | 0.40 | 0.49 | 0.51 | 0.40 | 1.31 |  |
| COMPARATIVE EXAMPLE 1 | NO Si | ICP | 0.50 | 0.50 | 0.00 | 0.50 | 0.50 | 0.00 | 0.00 | — |
| COMPARATIVE EXAMPLE 2 | NO Si | ICP | 0.88 | 0.12 | 0.00 | 0.88 | 0.12 | 0.00 | 0.00 | — |

Figure 2:
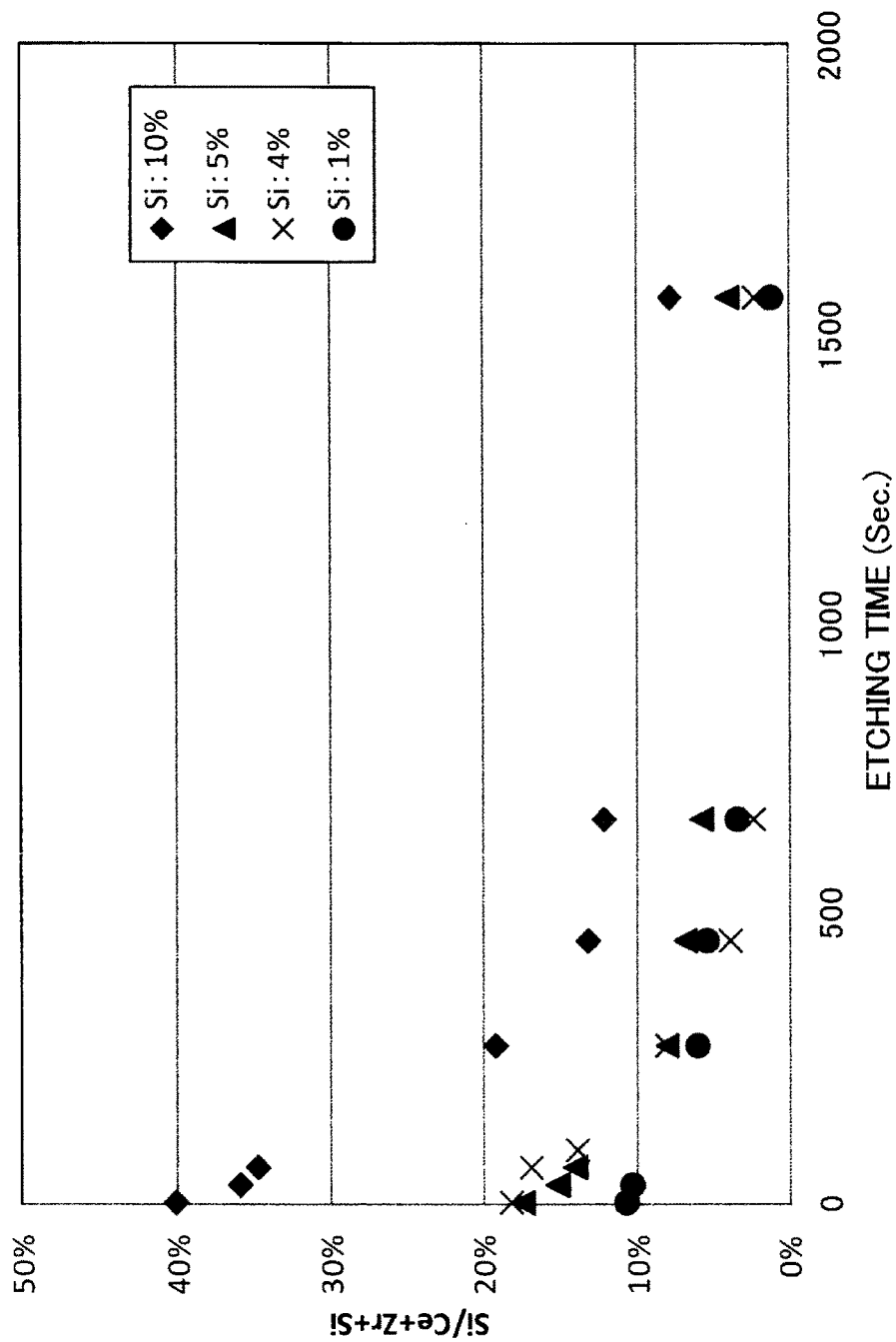
FIG. 2 is a graph illustrating the results of XPS measurement of a silicon-supported CeZr oxide (precursor) according to the present invention while performing etching.

FIG. 2 shows the results of XPS measurement while the catalyst is etched using a sputter. The vertical axis represents Si/(Ce+Zr+Si), that is, a ratio (%) of Si to all the elements of the precursor. The horizontal axis represents an etching time (second). In FIG. 2, rhombuses represent Example in which the mixing ratio of Si is 10%, triangles represent Example in which the mixing ratio of Si is 5%, cross marks represent Example in which the mixing ratio of Si is 4%, and circles represent Example in which the mixing ratio of Si is 1%.

The ratio of Si in all the samples decreases as etching proceeds. This is a result that shows the uneven distribution of Si on the particle surface. The uneven distribution of Si on the particle surface means that Si is supported on the particle surface or the particle surface is coated with Si.

Figure 3:
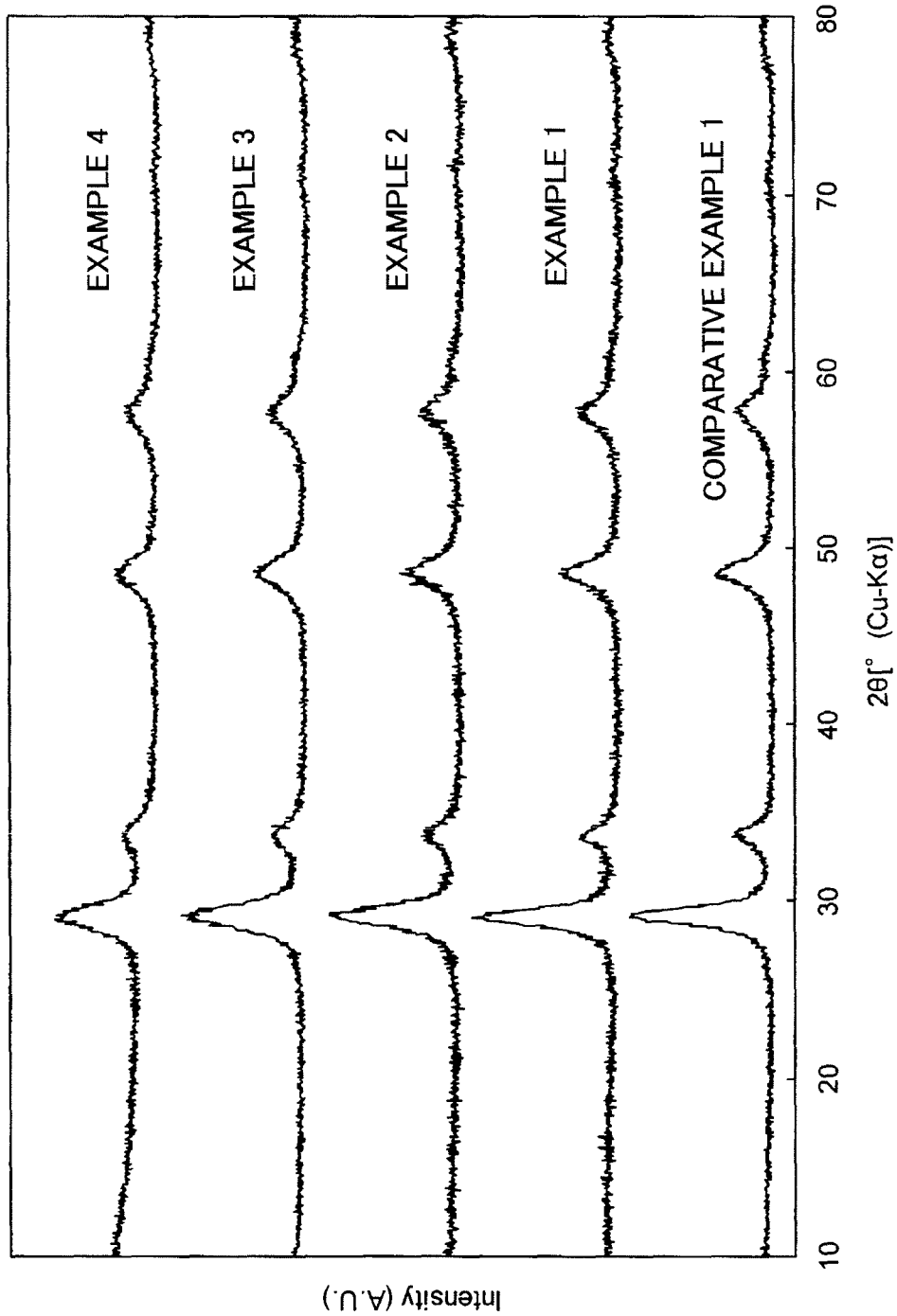
FIG. 3 is a graph (supported metal: Ni) illustrating the comparison of the results of XRD measurement of the catalyst according to the present invention with those of a catalyst in Comparative Example.
Figure 4:
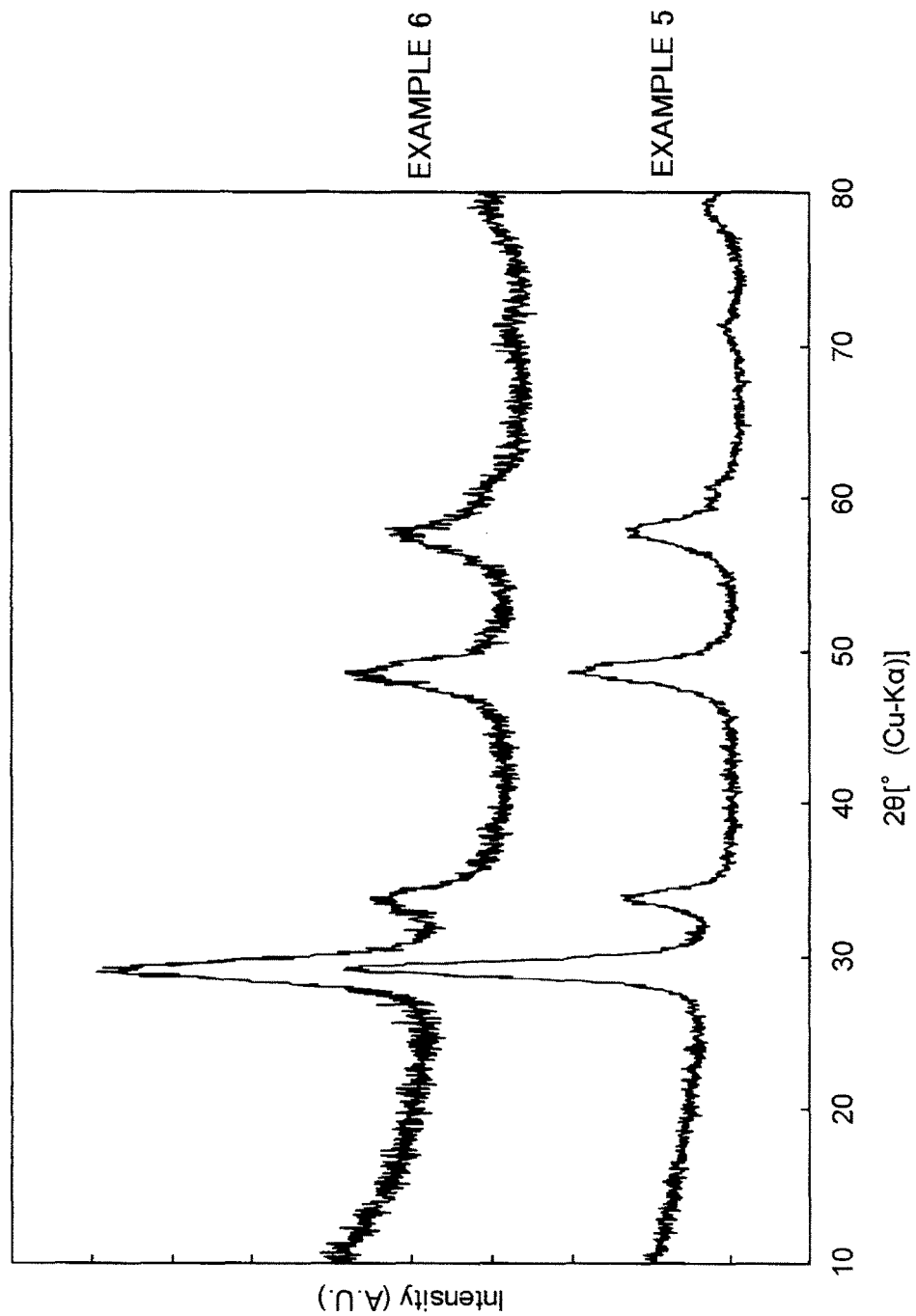
FIG. 4 is a graph (supported metal: Rh) illustrating the comparison of the results of XRD measurement of the catalyst according to the present invention.

FIG. 3 shows the results of X-ray diffraction in Examples 1 to 4 and Comparative Example 1. The vertical axis represents an intensity (arbitrary unit) and the horizontal axis represents an angle (2θ). As a radiation source, a Cu—Kα ray was used. In Comparative Example 1, silicon was not contained. On the other hand, silicon was contained in Examples 1 to 4. The silicon ratio in the catalysts increases from Example 1 toward Example 4. Similarly, FIG. 4 shows the results of X-ray diffraction in Examples 5 and 6. In FIG. 4, silicon was contained and the catalytically active metal was Rh.

As shown in FIGS. 3 and 4, even when silicon is contained, a remarkable peak of the CeZr-based oxide is observed, and therefore the structure of the CeZr-based oxide is roughly maintained. Specifically, Ce and Zr are contained in the catalyst in a form of CeZr-based oxide.

<Specific Surface Area and Crystallite Diameter of Catalyst>

The specific surface area of the resulting catalyst powder before and after supporting Ni and the crystallite diameter Dx (nm) of the catalyst particles are shown in Table 2. The specific surface area of the catalyst powder before and after supporting Rh and the crystallite diameter Dx (nm) of the catalyst particles are shown in Table 3. The specific surface area was measured by a BET method. As compared with Comparative Examples in which Si is not contained, all the specific surface areas in Examples are high. When the Si content is larger, the specific surface area is larger. In Examples 4 and 6 in which the Si content is 10%, the specific surface area after supporting Ni is 65.6 $m^2/g$, and the specific surface area after supporting Rh is 62.8 $m^2/g$.

TABLE 2

| | BET($m^2$/g) | | |
|---|---|---|---|
| | BEFORE SUPPORTING Ni | AFTER SUPPORTING Ni | DX |
| EXAMPLE 1 | 54.5 | 38.8 | 6.2 |
| EXAMPLE 2 | 58.5 | 45.7 | 5.7 |
| EXAMPLE 3 | 66.9 | 63.0 | 4.7 |
| EXAMPLE 4 | 82.1 | 65.6 | 4.9 |
| COMPARATIVE EXAMPLE 1 | 28.7 | 24.5 | 6.9 |
| COMPARATIVE EXAMPLE 2 | 38.0 | 36.0 | 12.0 |

TABLE 3

| | BET($m^2$/g) | | | | |
|---|---|---|---|---|---|
| | BEFORE SUPPORTING Rh | AFTER SUPPORTING Rh | Si/(Ce + Zr + Si) ICP | Si/Zr | DX |
| EXAMPLE 5 | 53.4 | 38.6 | 0.025 | 0.05 | 6.3 |
| EXAMPLE 6 | 82.1 | 62.8 | 0.10 | 0.21 | 4.9 |

<Oxygen Storage Amount at each Reduction Temperature>

The oxygen storage amount represents the amount of oxygen deficiency site. If the amount is large, an amount capable of storing oxygen is large. Therefore, an increase of heat of combustion can be expected.

A reduction treatment was performed at 200° C., 300° C., and 400° C. using the resulting Ni-supported catalyst (Examples 1 to 4 and Comparative Examples 1 and 2), and the oxygen absorption amount was measured at 50° C. The results are shown in Table 4. A reduction treatment was performed at 25° C., 100° C., and 200° C. using the resulting Rh-supported catalyst (Examples 5 and 6), and the oxygen absorption amount was measured at 50° C. The results are shown in Table 5. In the catalyst within the scope of the present invention, as the Si amount increases, the oxygen storage amount decreases. However, as described below, the carbon adsorption amount during repetition can be suppressed, and therefore the catalytic performance can be maintained over a long period of time.

Figure 5:
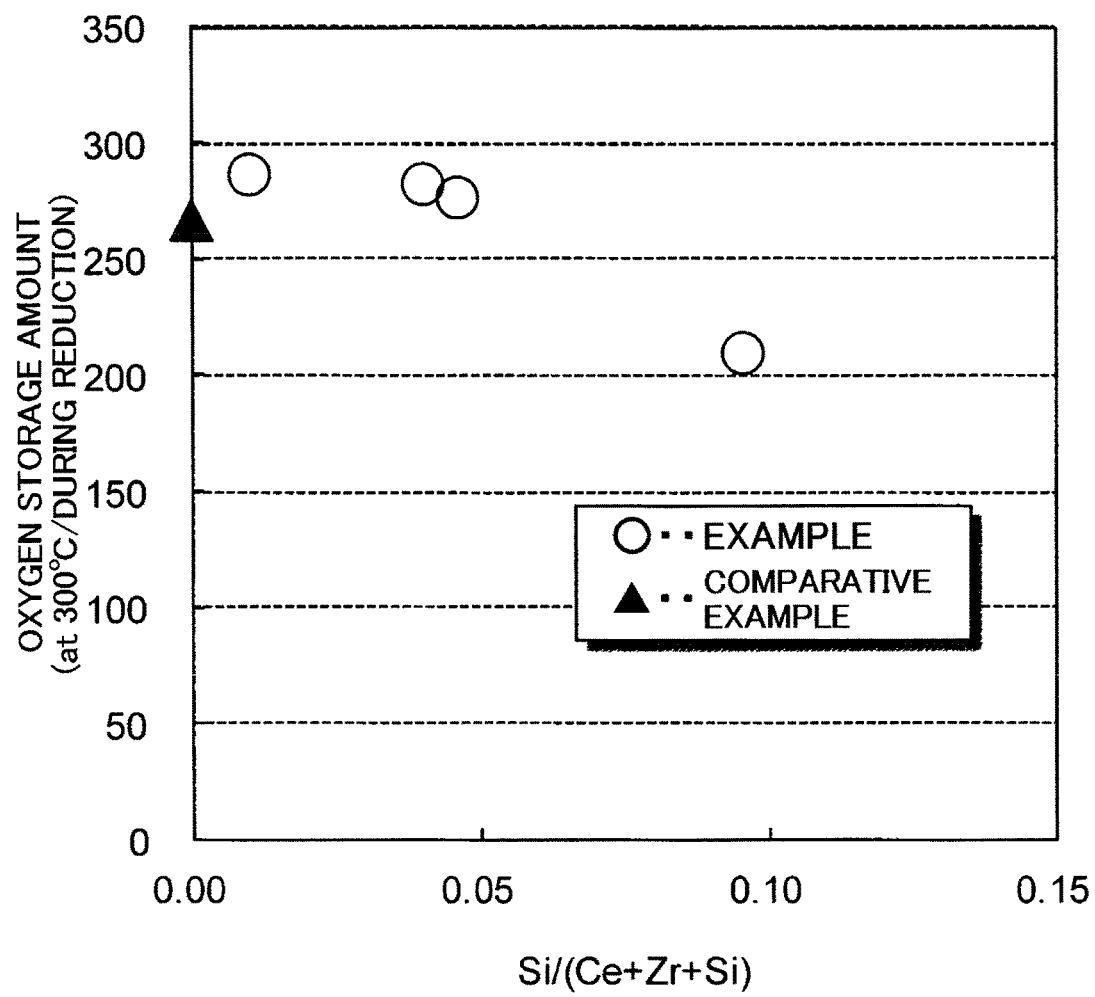
FIG. 5 is a graph (supported metal: Ni) illustrating a relationship between an oxygen storage amount and Si/(Ce+Zr+Si).

FIG. 5 represents a relationship between Si/(Ce+Zr+Si) and the oxygen storage amount in Examples 1 to 4 and Comparative Examples 1 and 2 (Ni-supported catalyst) during a reduction treatment at 300° C. The vertical axis represents an oxygen storage amount (μmol/g) during reduction at 300° C. and the horizontal axis represents Si/(Ce+Zr+Si). Open circles represent Examples and solid triangles represent Comparative Examples. As seen from FIG. 5, when the ratio of silicon to all the elements increases, the oxygen storage amount tends to be constant to some degree or increase, and when the ratio is higher than a certain limit, the oxygen storage amount tends to decrease. As seen from comparison of Examples 4 and 6, when Ni as the catalytically active metal is changed to Rh, the oxygen storage amount significantly increases. When Si/(Ce+Zr+Si) of 10% is changed to 2.5% (Example 5), the oxygen storage amount further increases.

The oxygen storage amount was measured using a normal-pressure fixed-bed pulsed-flow reactor. Specifically, the measurement was performed as follows. A quartz reaction tube having an outside diameter of 9.9 mm and an inner diameter of 7 mm was charged with 0.1 g of the catalyst. While pure $H_2$ (30 mL/min, 0.1 MPa) was caused to pass through the reaction tube, a reduction heat treatment was performed at 200° C., 300° C., and 400° C. using the Ni-supported catalyst in Examples 1 to 4 and Comparative Examples 1 and 2, and a reduction heat treatment was performed at room temperature (25° C.), 100° C., and 200° C. using the Rh-supported catalyst in Examples 5 and 6. A reduction activation treatment was performed at a heat treatment temperature with a temperature increasing rate to the heat treatment temperature of 10° C./min for a retention time of 1 hour. The flow gas was then switched to Ar (30 mL/min) and the catalyst was cooled to 50° C. 2.88 mL of pure $O_2$ was then pulsed at this temperature, and the amount of $O_2$ that remained without being absorbed by the catalyst was quantified with a TCD (thermal conductivity detector).

Subsequently, the reaction initiation temperature of these catalysts (Ni-supported catalyst) was measured. The results are shown in Table 2. When the content ratio of Si is higher (the content ratio in Example 4 is higher than that in Example 1), the reaction initiation temperature is higher. In the catalyst within the scope of the present invention, as the Si amount increases, the reaction initiation temperature increases. However, as described below, the carbon adsorption amount during repetition can be suppressed, and therefore the catalytic performance can be maintained over long time of period.

The reaction initiation temperature is a temperature at which the temperature is rapidly increased by applying heat from the outside while hydrocarbon as a fuel is caused to pass through each sample of Examples and Comparative Examples.

<Carbon Deposition Amount>

Tables 4 and 5 show a temperature (hereafter referred to as lowest reduction temperature) at which oxygen deficiency can be generated to an extent that a catalytically active metal component is activated and can act by causing an oxygen-containing gas to pass using a fixed-bed flow reactor, and heating the gas by heat of oxidation. A hydrogen reduction treatment was performed at the lowest reduction temperature for 1 hour, and purging with Ar was performed. A reforming reaction that was conducted at a normal temperature of 25° C. and a spatial velocity of 122 L/h·g under a heat insulation condition using 0.1 g of the catalyst and a reaction gas containing n-$C_4H_{10}$, $O_2$, $N_2$, and Ar at a ratio of n-$C_4H_{10}$/$O_2$/$N_2$/Ar of 1/2/1/7 was repeated 5 times. The results of measurement of carbon deposition amount after the repeated reaction are shown in Tables 4 and 5. The carbon deposition amount is obtained as a ratio (% by mass) of adsorption amount of carbon generated during passing of the reaction gas 5 times on the catalyst to the whole amount of the catalyst.

In order to measure the amount of carbon deposited on the catalyst after the reaction, analysis was performed using temperature programmed oxidation (TPO). A quartz tube reactor was charged using quartz wool with the whole amount (0.05 g when the use amount is large) of the catalyst after use in the reaction, and then set to a system shown in FIG. 9.

Figure 9:
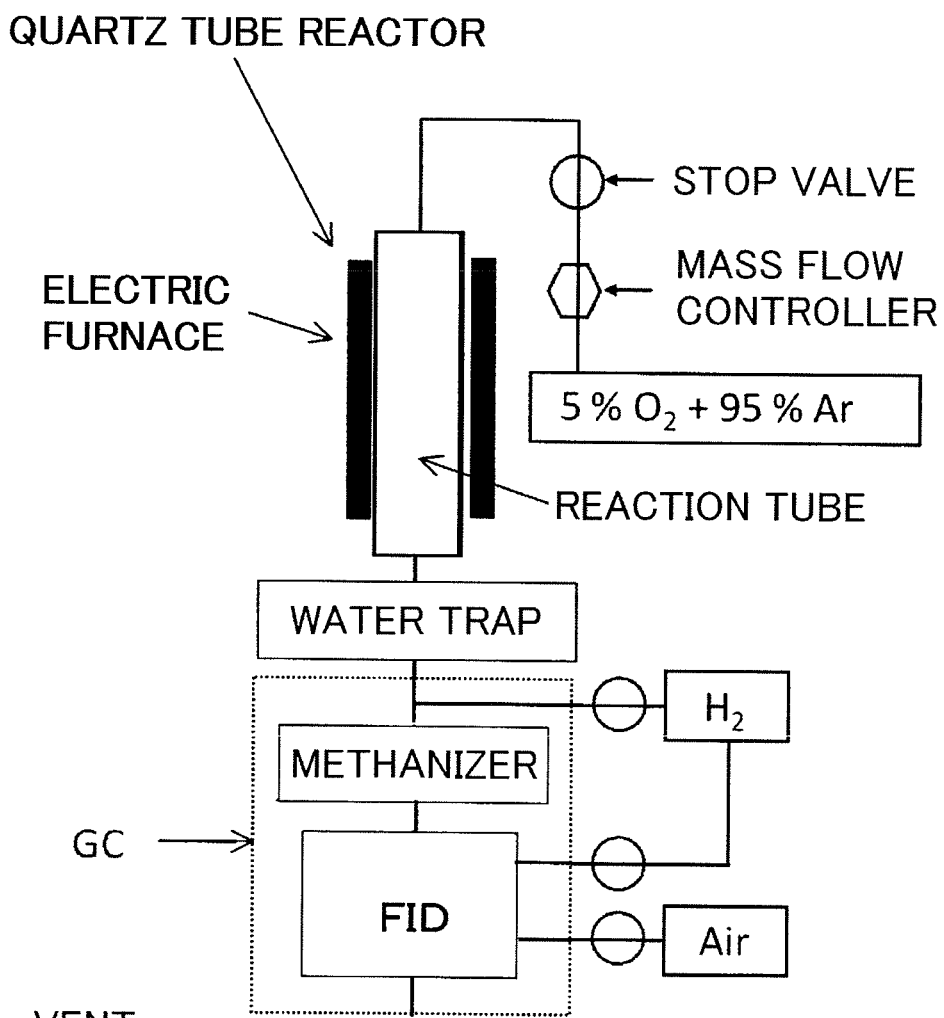
FIG. 9 is a schematic view of a device for measuring an amount of carbon generated on the catalyst.

FIG. 9 shows temperature programmed oxidation (TPO). A quartz tube reactor was charged using quartz wool with the whole amount (0.05 g when the use amount is large) of the catalyst after use in the reaction, and then set to a system in FIG. 9. After that, the temperature was increased at a rate of 10 K/min to 1,273 K under passing of mixed gas of $O_2$ and Ar at a ratio of 5/95 at a rate of 30 mL/min. A purified $CO_x$ was converted into $CH_4$ using a methanation catalyst (methanizer) disposed in a GC oven, and quantitative determination was performed with GC-FID (gas chromatography-flame ionization detector which is a gas chromatography equipped with a hydrogen flame ionization detector).

Figure 6:
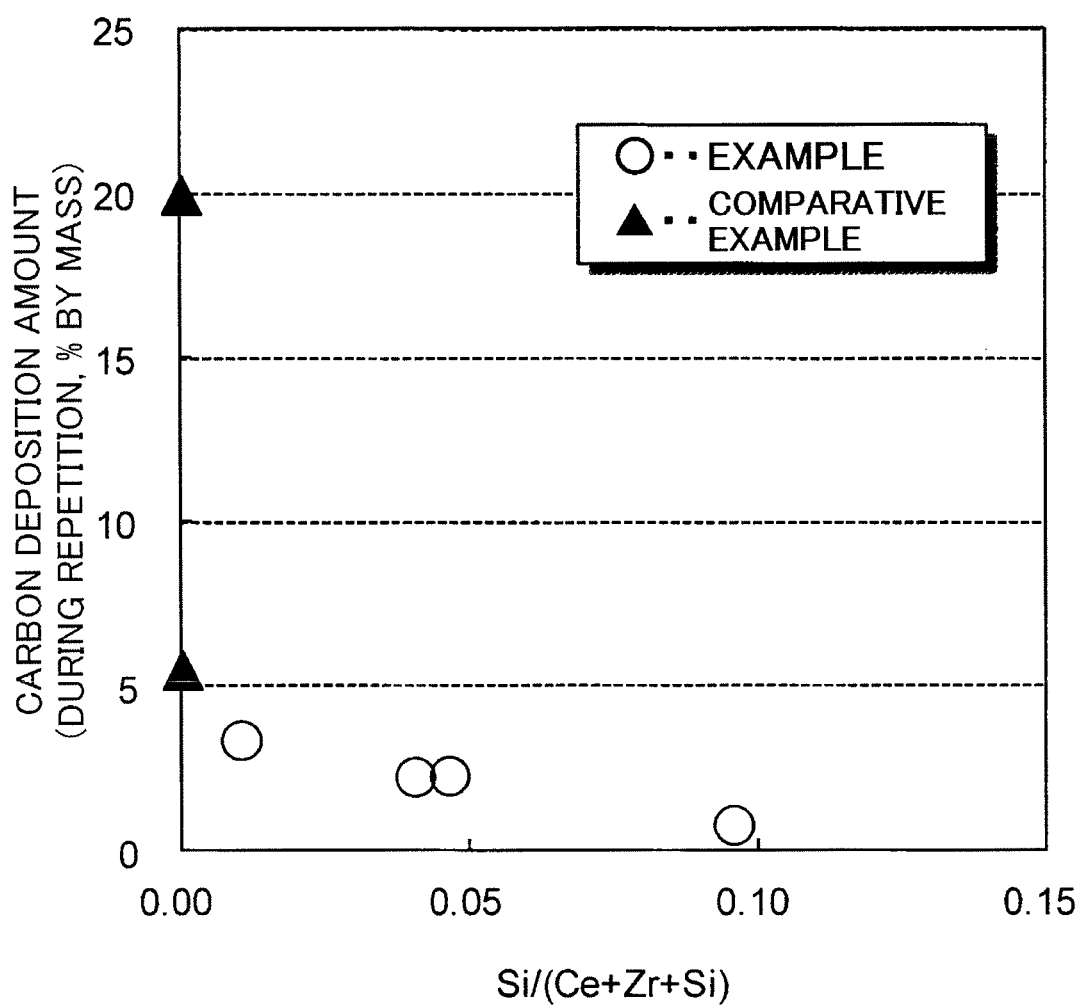
FIG. 6 is a graph (supported metal: Ni) illustrating a relationship between a carbon deposition amount and Si/(Ce+Zr+Si).
Figure 7:
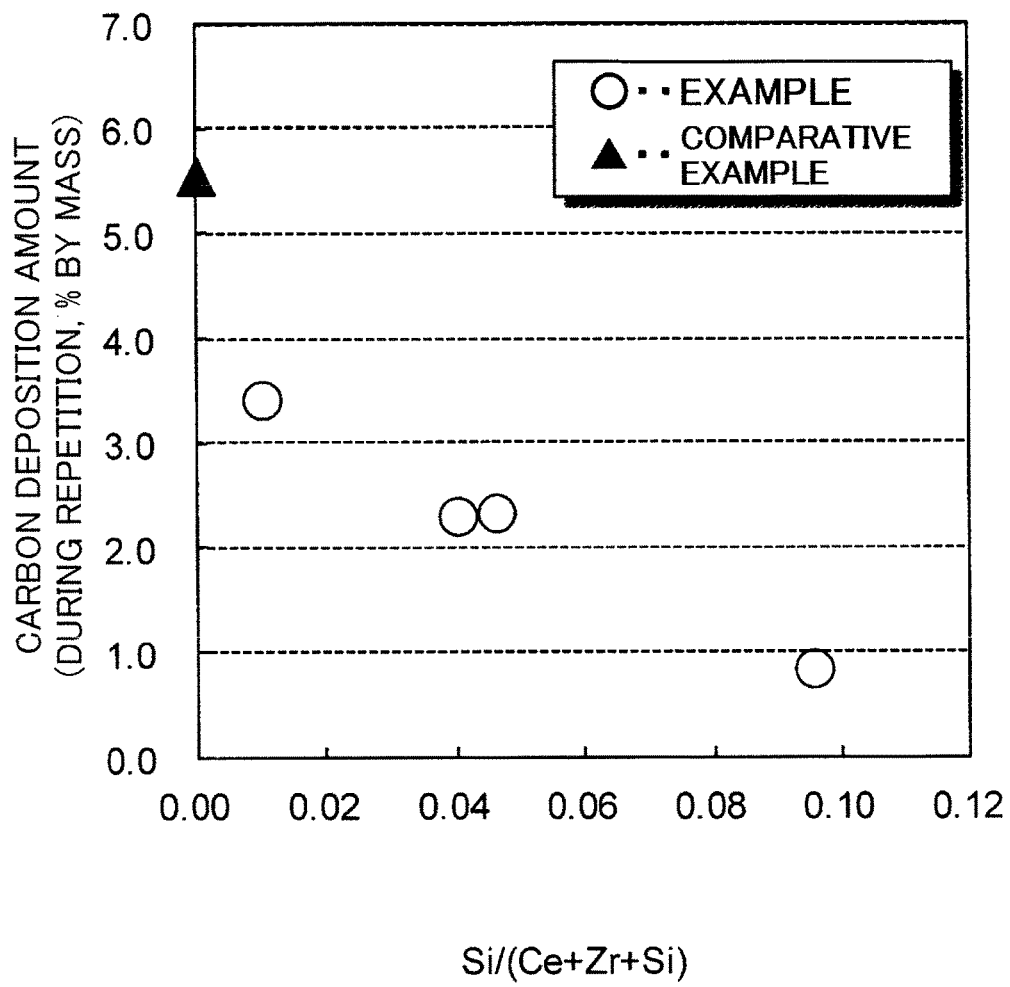
FIG. 7 is part of the graph (supported metal: Ni) illustrating a relationship between a carbon deposition amount and Si/(Ce+Zr+Si) on a larger scale.

In all Examples, the carbon deposition amount is low. When the Si content is larger, the carbon deposition amount is smaller. FIGS. 6 and 7 show graphs made from Table 2. The vertical axis represents a carbon deposition amount (during repetition, % by mass) and the horizontal axis represents a Si content ratio (Si/(Ce+Zr+Si)). As seen from FIG. 6, even in Comparative Examples in which Si is not contained, the carbon deposition amount in Comparative Example 1 in which the content of Zr is the same as Ce is 5.56% by mass, which is lower as compared with the carbon deposition amount of 20.00% by mass in Comparative Example 2 in which the content of Zr is small.

FIG. 7 shows a graph in which part in which the vertical axis in FIG. 6 is 7.0% by mass or less is expanded. The carbon deposition amount in Examples (open circles) is lower than that in Comparative Example 1 (solid triangles) in which the carbon deposition amount is small. Therefore, the catalysts in Examples have excellent long-term durability. As compared with the results of the reaction initiation temperature, when Si is contained, the carbon deposition amount decreases, but the reaction initiation temperature increases. Thus, there is a trade-off relation. However, even when 10% of Si is contained, the reaction initiation temperature of the catalyst according to the present invention is sufficiently practical, the carbon deposition amount is small, and the durability as the catalyst is improved. Therefore, it can be said that the catalyst is very useful.

When Ni (Example 4) as the catalytically active metal is changed to Rh (Example 6), the carbon deposition amount decreases (from 0.85% to 0.48%), and the reaction initiation temperature also decreases (from 390° C. to 258° C.). Therefore, it is seen that Rh is better as the catalytically active metal. Further, when Si/(Ce+Zr+Si) is changed from Example 6 to 2.5% (Example 5), the carbon deposition amount increases, but the lowest reduction temperature is normal temperature of 25° C. Therefore, the self-heating function can be exhibited without heating of the catalyst, and an oxidative reforming reaction can be driven.

<n-$C_4H_{10}$ Conversion>

The following reaction was performed using a normal-pressure fixed-bed flow reactor. A metal reaction tube having an outer diameter of 9.9 mm and an inner diameter of 7 mm and subjected to deactivation treatment on the inside thereof was charged with 0.2 g of the catalyst. The temperature was increased to 100 to 500° C. (10° C./min) under passing of pure $H_2$ (20 mL/min, 0.1 MPa), and the reaction tube was held at this temperature for 1 hour to cause a reduction activation treatment. The flow gas was then switched to Ar (50 mL/min) and the catalyst layer was cooled to 100° C. at which it was possible to stably supply steam.

Activity was then measured (under conditions of a catalyst layer inlet temperature during starting of activity measurement of 100° C., a reaction pressure of 0.1 MPa, a molar ratio of n-$C_4H_{10}$/$O_2$/$H_2O$/$N_2$/Ar of 1/2/4/1/7, a total gas supply rate of 555 mL/min, and a spatial velocity (SV) of 333 L/hr·g). The reaction product after 60 minutes was analyzed with a gas chromatograph equipped with a TCD detector (6,890 N (Agilent Technologies), HP-PLOT Molesieve and HP-PLOT Q).

During measurement of activity, heating with an electric furnace was not carried out, but the catalyst layer was heated by heat generated in the reaction. $N_2$ was used as an internal standard during calculation of n-$C_4H_{10}$ conversion. Calculation expressions are as shown by Expression (1). The n-$C_4H_{10}$ conversions are shown in Tables 4 and 5.

[Expression 1]

$$C_4H_{10} \text{ CONVERSION}(\%) = \frac{\text{VOLUME CONCENTRATION OF } C_4H_{10} \text{ OF REACTOR INLET} - \text{VOLUME CONCENTRATION OF } C_4H_{10} \text{ OF REACTOR OUTLET} \times \alpha}{\text{VOLUME CONCENTRATION OF } C_4H_{10} \text{ OF REACTOR INLET}} \times 100 \quad (1)$$

$$\text{where } \alpha = \frac{\text{VOLUME CONCENTRATION OF } N_2 \text{ OF REACTION INLET}}{\text{VOLUME CONCENTRATION OF } N_2 \text{ OF REACTION OUTLET}}$$

Figure 8:
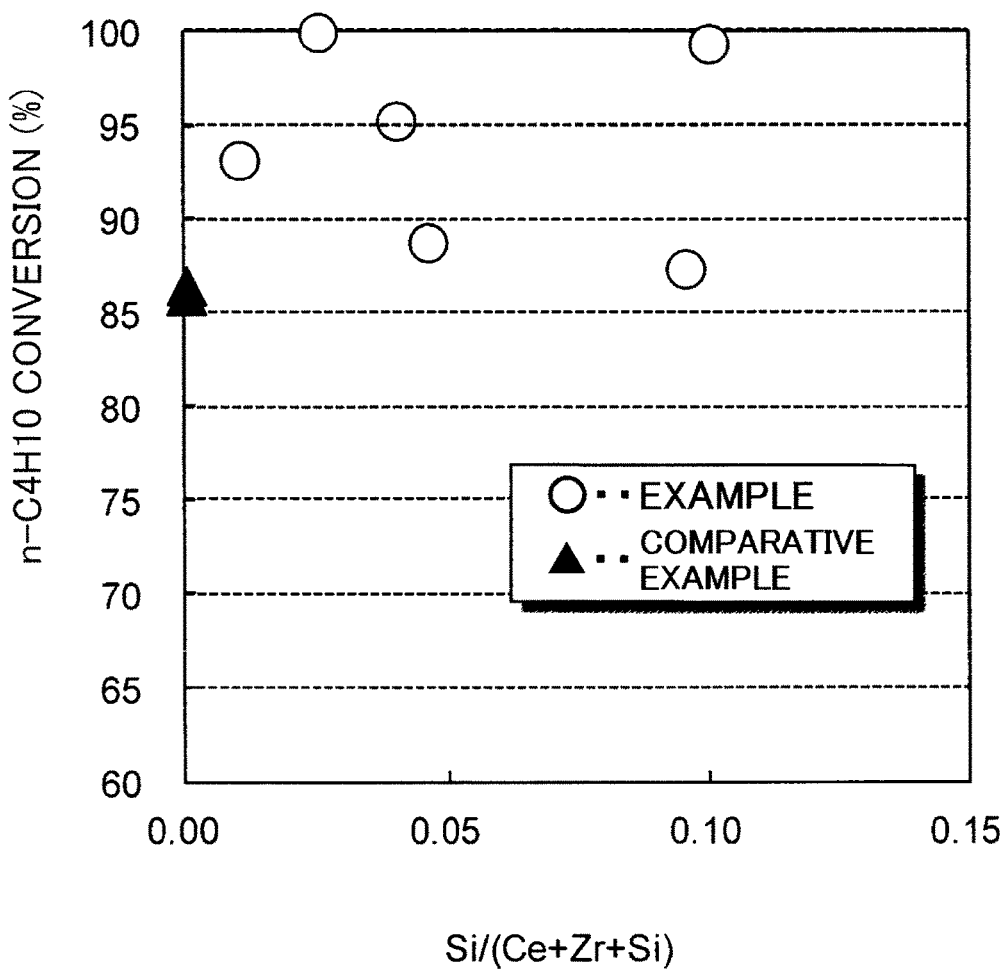
FIG. 8 is a graph illustrating a relationship between an $n-C_4H_{10}$ conversion and Si/(Ce+Zr+Si).

The n-$C_4H_{10}$ conversions are shown in Tables 2 and 3. The n-$C_4H_{10}$ conversions are shown in FIG. 8. The vertical axis represents an n-$C_4H_{10}$ conversion (%) and the horizontal axis represents a Si content ratio (Si/(Ce+Zr+Si)). In all Examples (open circles), the n-$C_4H_{10}$ conversion (%) is higher than that in Comparative Example (solid triangle), and the catalysts are excellent in the oxidative reforming reaction.

TABLE 4

| | OXYGEN STORAGE AMOUNT AT EACH REDUCTION TEMPERATURE (μmol/g) | | | REACTION INITIATION TEMPERATURE | CARBON DEPOSITION AMOUNT | LOWEST REDUCTION TEMPERATURE | n-C4H10 CONVERSION (%) AFTER |
|---|---|---|---|---|---|---|---|
| | 200° C. | 300° C. | 400° C. | (° C.) | REPETITION | (° C.) | 60 MINUTES |
| EXAMPLE 1 | 198.6 | 286.9 | 358.1 | 341 | 3.42 | 200 | 93.2 |
| EXAMPLE 2 | 170.0 | 282.8 | 326.5 | 349 | 2.31 | 300 | 95.3 |
| EXAMPLE 3 | 89.1 | 277.0 | 317.1 | 350 | 2.34 | 300 | 88.8 |
| EXAMPLE 4 | 50.0 | 210.0 | 260.0 | 390 | 0.85 | 400 | 87.4 |
| COMPARATIVE EXAMPLE 1 | 102.4 | 267.1 | 329.2 | 342 | 5.56 | 300 | 86.5 |
| COMPARATIVE EXAMPLE 2 | 76.3 | 113.6 | 204.1 | 304 | 20.00 | 300 | 86.0 |

TABLE 5

| | OXYGEN STORAGE AMOUNT AT EACH REDUCTION TEMPERATURE (μmol/g) | | | REACTION INITIATION TEMPERATURE | CARBON DEPOSITION AMOUNT REPETITION | LOWEST REDUCTION TEMPERATURE (° C.) | n-C4H10 CONVERSION (%) AFTER 60 MINUTES |
|---|---|---|---|---|---|---|---|
| | 25° C. | 100° C. | 200° C. | | | | |
| EXAMPLE 5 | 175.3 | 225.4 | 252.2 | 255 | 0.56 | 25 | 100.0 |
| EXAMPLE 6 | 98.8 | 192.0 | 217.1 | 258 | 0.48 | 50 | 99.4 |

INDUSTRIAL APPLICABILITY

When the catalyst according to the present invention is used, the reduction treatment temperature further decreases, and in some cases, the reduction treatment is possible without heating. Therefore, a heating means and a thermal insulation structure can be simplified, and the hydrogen generating device can be made small in size. The catalyst according to the present invention can withstand repetition use, and therefore the life of the catalyst can be prolonged, and maintenance is not necessary. Accordingly, the possibility of the catalyst that can be used for a wide application including a movable power source for a fuel cell of a hydrogen generating device, a pure hydrogen-type fuel cell, a hydrogen automobile using hydrogen as a fuel, various types of transportations and movable bodies, and a thermomotor such as an engine.

REFERENCE SIGNS LIST 10 fuel cell system
12 hydrocarbon gas supplier
13 oxygen supplier
14 reformer
15 reformed gas
16 mixing valve
17 valve
18 valve
30 solid oxide fuel cell (SOFC)
31 sealless partition plate
32 anode region
33 cathode region
34 solid electrolyte
35 oxygen supplying pipe
36 negative electrode
37 positive electrode
38 load
39 exhaust gas outlet
40 tank
41 heat source
42 power supply
43 charge controller

The invention claimed is:

1. A catalyst comprising a CeZr-based oxide, silicon, and a catalytically active metal, wherein
the CeZr-based oxide satisfies $Ce_xZr_yO_2$ (x+y=1), and
the silicon satisfies molar ratios of $0.02 \leq Si/Zr$ and $0.01 < Si/(Ce+Zr+Si) < 0.1$.

2. The catalyst according to claim 1, wherein the catalytically active metal is at least one selected from a platinum group element, nickel, and cobalt.

3. The catalyst according to claim 1, wherein the silicon is localized on a surface of the CeZr-based oxide.

4. A method for producing a hydrogen-containing gas by bringing a raw material gas containing hydrocarbon or alcohol and oxygen into contact with the catalyst as set forth in claim 1, the method comprising:
a temperature increasing step of adjusting the catalyst at 20 to 600° C. under a reduction atmosphere to come into contact with oxygen in the raw material gas, and increasing the temperature of the raw material gas by self-heating of the catalyst to a temperature at which a burning reaction of hydrocarbon or alcohol with oxygen contained in the raw material gas occurs, to burn hydrocarbon or alcohol contained in the raw material gas; and
a step of reforming the raw material gas using the catalyst of which the temperature is increased in the temperature increasing step.

5. The method for producing a hydrogen-containing gas according to claim 4, wherein the catalyst is adjusted at 20 to 200° C. under a reduction atmosphere.

6. A hydrogen generating device comprising: a mechanism for supplying hydrocarbon or alcohol; and a mechanism for supplying oxygen, and further a reformer in which the catalyst as set forth in claim 1 is disposed in a container connected to these mechanisms.

7. The hydrogen generating device according to claim 6, comprising a mechanism for separating hydrogen from a discharged gas, the mechanism being connected to the reformer.

8. A fuel cell system comprising the hydrogen generating device as set forth in claim 6 incorporated therein.

9. A silicon-supported CeZr-based oxide used in the catalyst as set forth in claim 1, wherein
the CeZr-based oxide satisfies $Ce_xZr_yO_2$ (x+y=1), and
the silicon satisfies molar ratios of $0.02 \leq Si/Zr$ and $0.01 < Si/(Ce+Zr+Si) < 0.1$.

\* \* \* \* \*